Jan. 30, 1940. M. K. DAVIS 2,188,708
FOOD CABINET
Filed March 25, 1939 2 Sheets-Sheet 1

INVENTOR.
Milton K. Davis
BY
ATTORNEY.

Jan. 30, 1940.　　　M. K. DAVIS　　　2,188,708
FOOD CABINET
Filed March 25, 1939　　　2 Sheets-Sheet 2

INVENTOR.
Milton K. Davis
BY
ATTORNEY.

Patented Jan. 30, 1940

2,188,708

UNITED STATES PATENT OFFICE 2,188,708

FOOD CABINET

Milton K. Davis, Dallas, Tex., assignor to Len Acton and Milton K. Davis, doing business as Point-O-Purchase Advertising Company Application March 25, 1939, Serial No. 264,263

3 Claims. (Cl. 261—12)

This invention relates to new and useful improvements in food cabinets.

One object of the invention is to provide an improved cabinet for storing bread, cake, and other food products and having means for attractively displaying the products to the prospective purchaser or consumer.

An important object of the invention is to provide an improved cabinet for storing foods which is so constructed that the temperature and humidity of the air within the interior of the cabinet may be controlled within certain limits, whereby the food products are stored under ideal temperature and humidity conditions, which prevent them from becoming dry or "stale" and make it possible to maintain the products in their original fresh condition for a prolonged period of time.

Another object of the invention is to provide an improved food cabinet wherein the air at the lower end of the cabinet is heated and is directed upwardly along one side of the interior of the cabinet, whereby an automatic and constant circulation of air is set up and maintained within the casing; there also being adjustable means for adding moisture to the circulating air, whereby the condition of the air within the cabinet is controlled, the arrangement involving a minimum number of parts, which reduces cost of manufacture and minimizes operating expense.

A particular object of the invention is to provide a cabinet, of the character described, wherein the door or closure, which normally closes the access opening by which access to the interior is had, is actuated by a foot lever, thereby leaving the operator's hands free for other purposes.

Still another object of the invention is to provide a food storage cabinet having its upper portion constructed of glass, or other transparent material, whereby the products therein are clearly visible; the food products being supported upon offset or stepped shelves, which makes all of said products clearly and attractively visible.

A construction designed to carry out the invention will be hereinafter described, together with other features of the invention.

Figure 1:
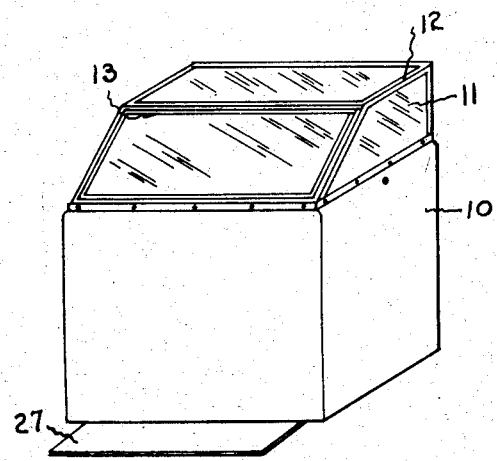
Figure 4:
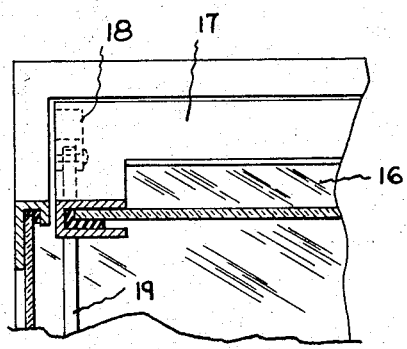
Figure 4:
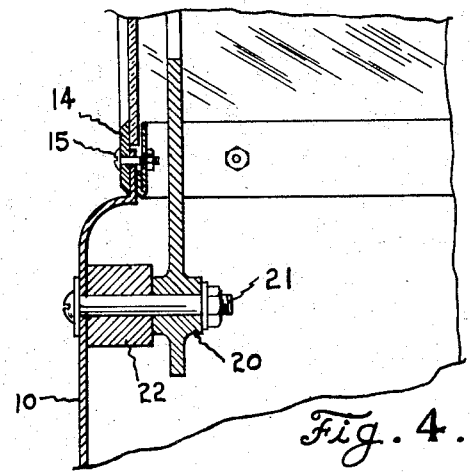
Figure 2:
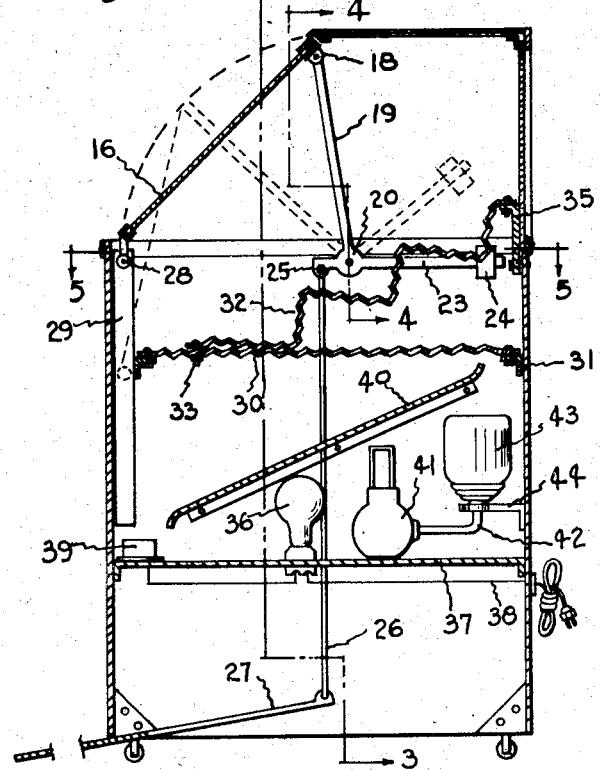
Figure 6:
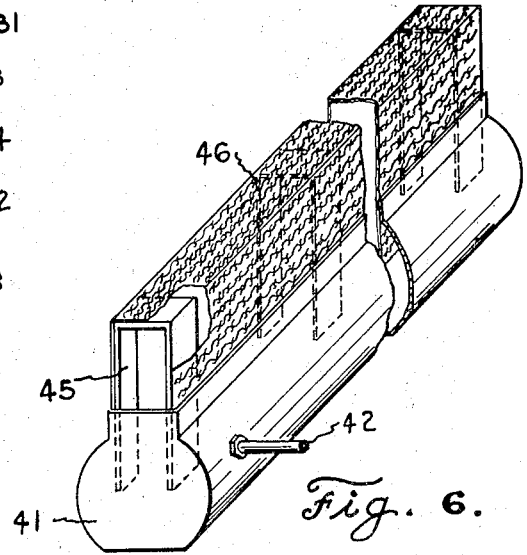
Figure 3:
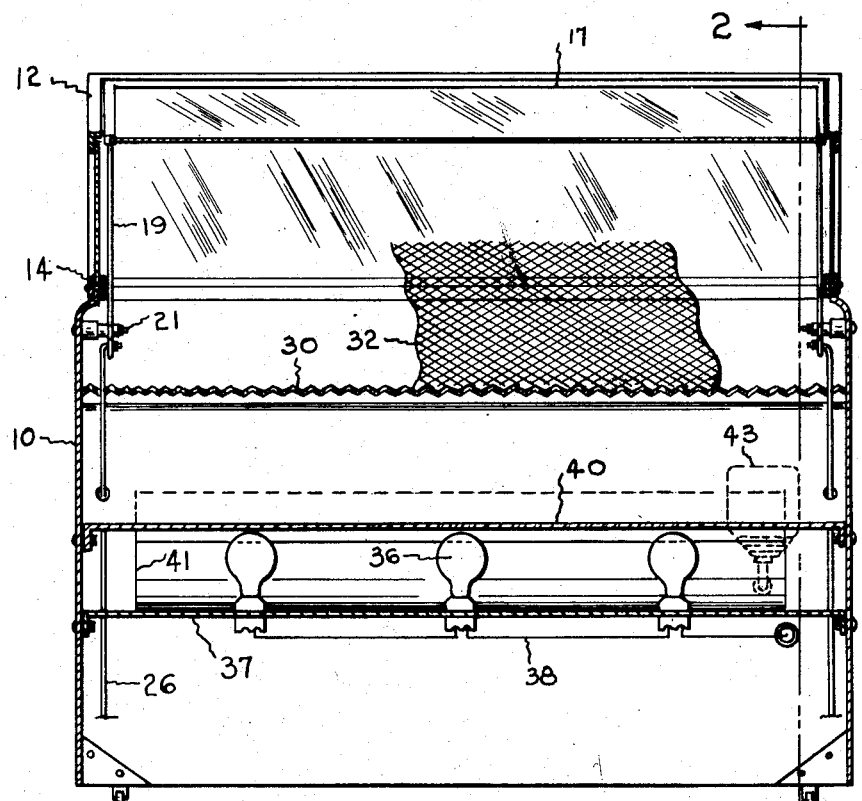
Figure 5:
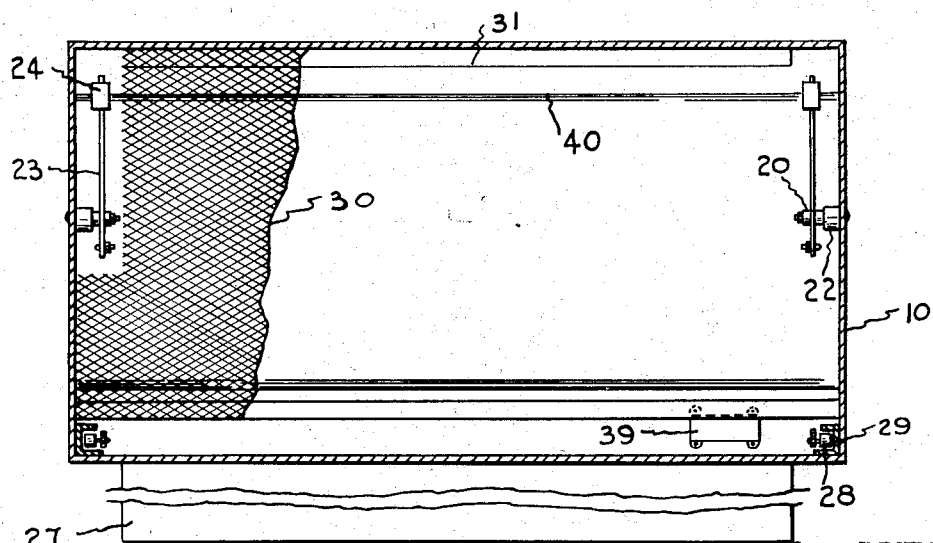

The invention will be more readily understood from a reading of the following specification and by reference to the accompanying drawings, in which an example of the invention is shown, and wherein:

Figure 1 is an isometric view of a food cabinet, constructed in accordance with the invention, Figure 2 is a transverse, vertical, sectional view of the same, Figure 3 is a longitudinal, sectional view, taken on the line 3—3 of Figure 2, Figure 4 is a partial, vertical, sectional view, taken on the line 4—4 of Figure 2, Figure 5 is a horizontal, cross-sectional view taken on the line 5—5 of Figure 2, and Figure 6 is a partial isometric view of the water trough, together with the wick mounting.

In the drawings, the numeral 10 designates a casing or housing which is constructed of wood, metal or other suitable material. The casing is substantially rectangular in cross-section and has its upper end closed by a glass hood or top 11. This hood, as is clearly shown in Figure 1, forms the upper end of the cabinet and, although it is preferable that the same be constructed of glass suitably supported in metallic or other frames 12, said top may be made of any transparent material. One side of the transparent hood 11 is open, whereby a rectangular opening 13 is formed therein and this opening is preferably on the front side of the cabinet. As shown, the hood is inclined, whereby the opening 13 is also inclined. Access to the interior of the casing is had through the opening 13.

The glass hood or top 11 may be secured to the casing 10 in any suitable manner and, as shown, is fastened by flat strips 14 and bolts 15 (Figure 4). However, any suitable means of securing these parts together may be employed. The inclined opening 13 formed in the forward side of the hood 11 is normally closed by a glass door or closure 16. The glass portion of the door is mounted within a rectangular frame 17, which may be constructed of metal or other suitable material. The upper portion of the frame 17 is provided with inwardly extending ears or lugs 18 which are located one at each end of the closure, whereby said lugs are disposed adjacent to the side walls of the cabinet. Each lug has the upper end of an operating arm or lever 19 pivotally secured thereto and each operating lever extends contiguous to the vertical side wall of the cabinet (Figure 4). The lower end of each lever 19 is formed with an enlarged bearing collar 20 through which a pivot bolt 21 extends. The bolt also extends through a block 22 and through the wall of the casing 10, whereby each lever is pivotally mounted at its lower end. Manifestly, when the lever is swung downwardly and forwardly, the upper end of the door is moved therewith.

Each lever is formed with a radially extending arm 23, which is preferably made integral with the collar or hub 20 and an adjustable weight 24 is slidably mounted on the arm 23. The weight 24 serves to counterbalance the weight of the door or closure 16 to facilitate the operation of said door when the operating lever 19 is swung. Obviously, the weight may be moved along the arm 23 to various positions, whereby closures of different weight may be balanced.

For swinging the operating levers 19 simultaneously, the hub or collar 20 of each lever is formed with an extended ear 25 and the upper end of a connecting rod 26 is pivoted thereto. Each rod extends downwardly contiguous to the inner wall of the cabinet 10 and has its lower end pivotally connected to an operating member 27. As is clearly shown in Figure 5, the operating member extends longitudinally of the cabinet and has its inner end disposed within the interior thereof, the bottom of said cabinet being open to receive this inner portion of the operating member. The outer end of the operating member 27, which is, in effect, a platform, rests upon the floor outside of the casing 10. When it is desired to swing the levers 19, it is only necessary to apply a downward pressure to the platform or member 27, which results in a downward pull on the connecting rod 26. Due to the connection of the rods 26 with the ears 25 of the levers 19, it will be obvious that the levers are swung toward the dotted line position shown in Figure 2, with the result that the upper end of the door or closure 16 is moved forwardly and downwardly.

In order to guide the movement of the closure or door 16 as it is being moved to its open position by the swinging of the levers 19, the lower portion of the frame 17 is provided with a pair of rollers 28, one of which is secured to each end of the frame. Each roller 28 is arranged to ride within a vertical guide channel 29, which is suitably fastened to the inner front wall of the casing 10. When the levers 19 are swung, the upper end of the door or closure 16 is moved through an arc, while the lower end of the closure is guided vertically and travels downwardly through the guide channel 29. With this arrangement, it is manifest that the door or closure may be quickly opened by merely depressing the operating platform 27. The provision of the weight 24 causes the door to return to its closed or upper position when the pressure on the platform is relieved.

For supporting the bread, cake, or other food products, within the interior of the cabinet, a longitudinally extending shelf 30 is mounted within the interior of the casing 10, being supported on suitable angular brackets or bars 31, which are secured to the inner wall of said casing. This shelf is preferably constructed of expanded metal or other perforated material, whereby an unobstructed flow of air therethrough may occur. Secured to the shelf 30 is a suitable offset or stepped support 32, said support being fastened to the shelf by bolts 33 along one longitudinal edge of said support. The other longitudinal edge of the support is secured by bolts 34 to a bracket 35 which has its lower end fastened to the inner wall of the casing 10, as is clearly shown in Figure 3. Obviously, the offset support provides a plurality of shelves in different planes, whereby the bread or other food products may be supported on the various shelves in offset relation to each other. In this manner, a most attractive display of the bread or other products is obtained. The offset support 32 is also preferably constructed of expanded metal or other perforated material so as to permit a free circulation of air therethrough. Since the upper portion of the cabinet is formed by the hood 11, which has transparent walls, the food products supported within the interior of the cabinet are clearly visible to the prospective purchaser or consumer. By offsetting the support, all of the products are visible and the products on the second shelf are not hidden by those on the first shelf. This makes for a most attractive display of the goods offered for sale.

To control the heating of the interior of the cabinet so as to maintain the temperature of the air within said interior within certain limits, a plurality of heating lamps 36 are provided. These lamps are supported on a transverse partition or shelf 37 which extends longitudinally and transversely across the interior of the cabinet. The ends of the shelf or partition may be bent downwardly so as to lie contiguous to the inner wall of the casing 10 and to facilitate their fastening to said wall. The lamps 36 may vary in number and may be of the incandescent type, being supplied with electrical current through the usual lead wires 38. A suitable thermostat 39, such as may be purchased on the open market, is connected in the electrical circuit and this thermostat controls the lighting of the lamps in accordance with the temperature within the cabinet. Thus, if the temperature within the cabinet exceeds the point for which the thermostat 39 is adjusted, the lamps 36 are extinguished so as to permit the air within said cabinet to cool. As soon as the temperature falls to a predetermined point, the lamps are lighted to supply heat to the interior. In this manner, the temperature of the interior of the cabinet is controlled.

To accomplish a circulation of air through the interior of the cabinet and around the products supported on the offset shelves 32, an inclined deflector or baffle 40 is disposed above the heating lamps 36. This baffle extends longitudinally of the interior of the cabinet and has its ends secured to the end walls of the casing 10. The longitudinal edges of the baffle 40 are spaced from the side walls of the cabinet, whereby air may flow between such longitudinal edges of said side walls. By observing Figure 2, it will be seen that the air which is heated by the lamps 36 will rise upwardly, travelling along the underside of the deflector or baffle 40. This heated air will escape upwardly and into contact with the products supported on the offset shelves 32. The air is permitted to pass through the supports 30 and 32 since said supports are perforated or are constructed of an expanded metal, as has been explained. The heated air will, of course, rise to the top of the cabinet, while the cool air in the upper end thereof will travel downwardly along the front side of said cabinet. This cooled air will pass downwardly until it strikes the partition and will then be drawn beneath the deflector or baffle 40 so as to be re-heated. With this arrangement, a constant circulation of air within the interior of the cabinet is obtained.

For controlling the humidity of the circulating air, a water trough 41 is mounted on the partition or shelf 37 adjacent the heating lamps 36. As is clearly shown in Figures 2 and 3, the trough extends longitudinally within the casing and is supplied with water through a pipe 42, which pipe has connection with a water supply container 43. The container 43 is supported in a suitable bracket 44 secured to the inner wall of the casing 10.

The upper end of the water trough is reduced and is substantially rectangular in cross-section.

This upper end of the trough is open and is adapted to receive a plurality of U-shaped resilient supporting members 45 which have their lower ends engaged within the trough. The resiliency of the arms of these U-shaped members is sufficient to support said members in various positions relative to the trough; that is, the members 45 may be moved inwardly and outwardly of said trough so that their upper ends are spaced more or less from the top thereof. A longitudinal wick 46 is supported on the U-shaped members 45 and has its lower ends engaging within the water in said trough. The water is drawn upwardly into the wick by capillary attraction and, manifestly, the wick remains moist or wet at all times. The disposition of the trough and the wick 46 is such that said wick is disposed in the path of the upwardly moving air travelling along beneath the inclined deflector or baffle 40. If it is desired that more moisture be added to the air, it is only necessary to raise the supports 45, whereby a greater wick area will be exposed to the moving air. The wick will be raised into a zone immediately beneath the baffle 40 where the velocity of the air flow is greater and where the evaporative effect for that reason is also greater. While the wick serves to "baffle" the air flow, an important effect of raising or lowering the same is to project a greater or lesser amount of wick area into the stream of air flowing directly beneath the baffle 40. If less moisture is desired, the supports 45 are moved inwardly to reduce the area of the wick exposed to said air. Therefore the wick forms an adjustable moisture-supplying baffle whereby it is possible to control, within certain limits, the humidity of the air within the interior of the cabinet.

By controlling the temperature and humidity of the air, it is possible to maintain the products, stored within the cabinet for a prolonged period of time, without said products becoming stale or dry. It is well-known that the temperature and humidity of the air surrounding a food product affects the condition of said product. If there is too little moisture in the air, the bread or other product will become dry and stale. If excessive moisture is present, the food becomes soggy and, thus, by controlling the temperature and humidity, the food may be maintained in a fresh condition for a substantial length of time. The device, herein described, is simple in construction and includes a minimum number of parts. The manufacturing cost, as well as the cost of operation, is minimized. The closure or door 16 which normally closes the interior of the cabinet to prevent access thereto is readily operable by a slight pressure on the operating member or platform 27. The ease of operation of the door is brought about by the counterbalancing arrangement hereinbefore described.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. Apparatus for maintaining the moisture content of fresh baked bread, which includes a casing, an inclined deflecting baffle within the casing for guiding upwardly a sheet of air circulating within the casing, means for supporting fresh baked bread above the baffle and in the path of the circulating air, a heating element below the deflecting baffle for raising the temperature of the air and setting the air in motion along the baffle and within the casing, and a moisture-supplying baffle positioned for contact by the sheet of heated air flowing upwardly along the deflecting baffle, said moisture-supplying baffle being mounted for adjustment toward or from the deflecting baffle, thereby to produce variations in humidifying effect.

2. Apparatus for maintaining the moisture content of fresh baked bread, which includes a casing, an inclined deflecting baffle within the casing for guiding upwardly a sheet of air circulating within the casing, means for supporting fresh baked bread above the baffle and in the path of the circulating air, a heating element below the deflecting baffle for raising the temperature of the air and setting the air in motion along the baffle and within the casing, a moisture-containing trough supported below the deflecting baffle, a moisture-supplying baffle extending from the trough and formed of absorbent material, and means for supporting said moisture-supplying baffle adjustably in the path of the circulating heated air, said moisture-supplying baffle being shiftable relative to the inclined deflector to increase or reduce the amount of moisture supplied to the heated air by increasing or reducing the area of the exposed portion of the moisture-supplying baffle.

3. Apparatus for maintaining the moisture content of fresh baked bread which includes a casing for holding the bread, an inclined deflector within the casing, means thereabove for holding the bread to be treated, said deflector constituting means for guiding a sheet of air within the casing and upwardly to and around the bread, means under the deflector for heating the air and effecting circulation thereof, and humidifying means below the deflector and in the path of the circulating air, said humidifying means including an elongated water container having a top opening, a folded wick having its ends within the moisture container, means embraced by the wick for holding the wick adjustably to the moisture container and supporting the wick adjustably beyond the container, said wick being adjustable relative to the inclined deflector to increase or reduce the area of the surface of the wick exposed to the circulating air, thereby to increase or reduce the percentage of moisture delivered to the air.

MILTON K. DAVIS.